Sept. 7, 1943.    C. SEAMAN    2,328,927
ATTACHMENT FOR MAKING PUFFED, SHIRRED MATERIALS
Filed Jan. 17, 1942    4 Sheets-Sheet 1

INVENTOR.
CHARLES SEAMAN
BY Wm. S. Pritchard
ATTORNEY.

Sept. 7, 1943. C. SEAMAN 2,328,927
ATTACHMENT FOR MAKING PUFFED, SHIRRED MATERIALS
Filed Jan. 17, 1942 4 Sheets-Sheet 2
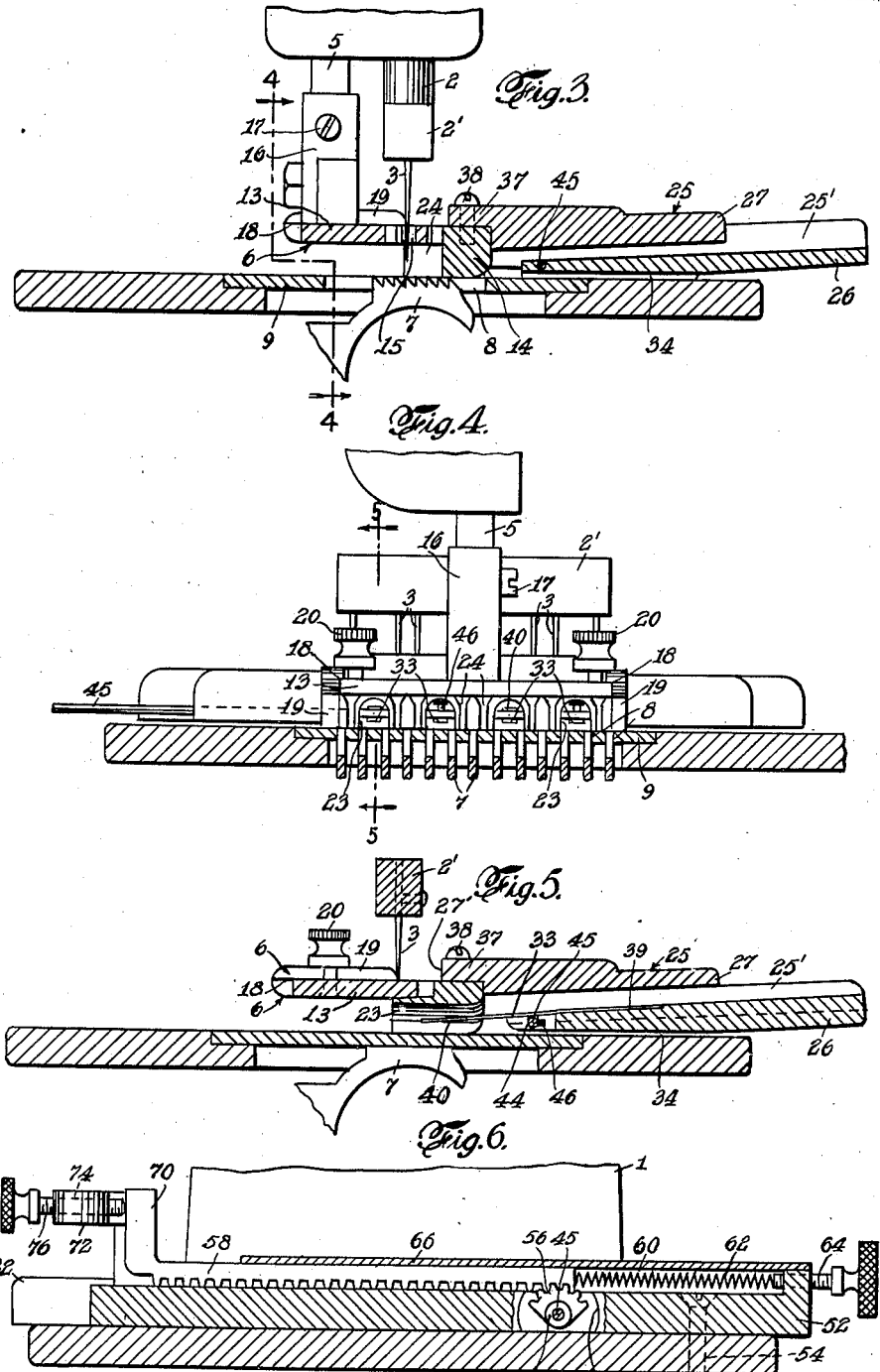
INVENTOR.
CHARLES SEAMAN
BY Wm. S. Pritchard
ATTORNEY Sept. 7, 1943.   C. SEAMAN   2,328,927
ATTACHMENT FOR MAKING PUFFED, SHIRRED MATERIALS
Filed Jan. 17, 1942   4 Sheets-Sheet 3
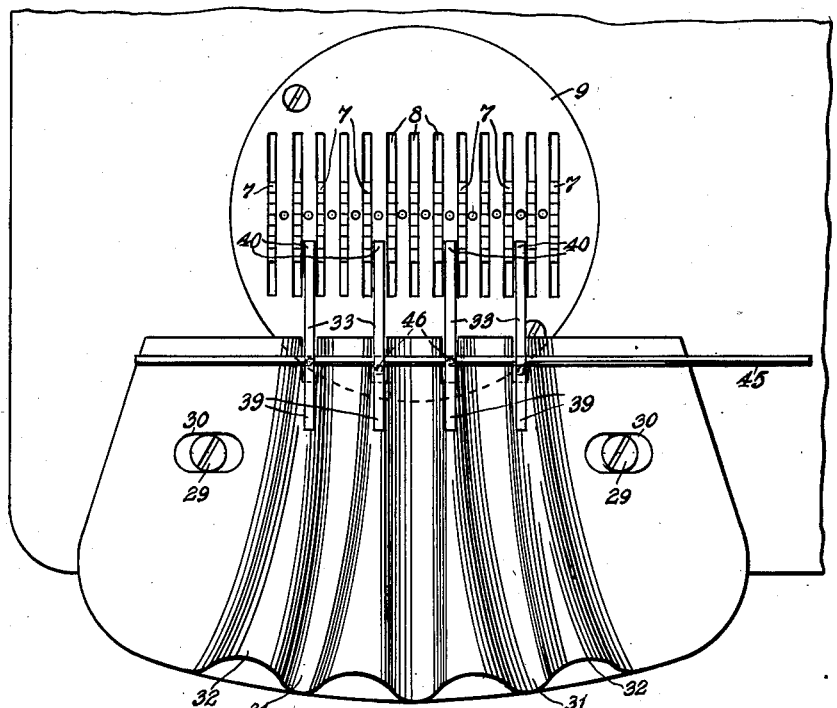
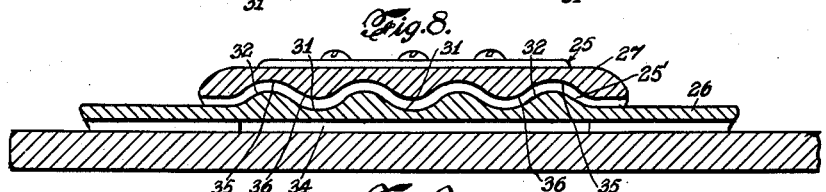
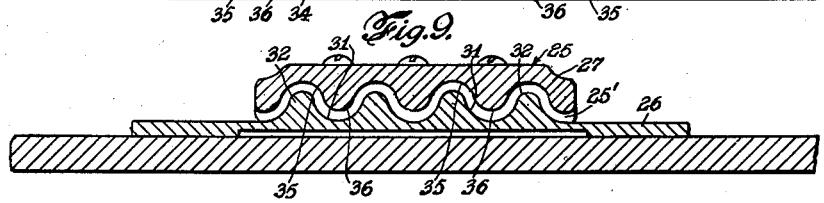
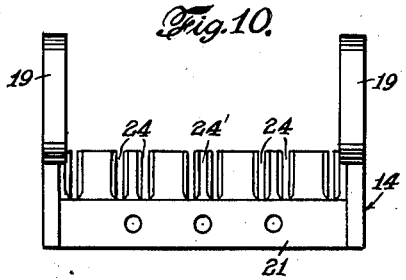 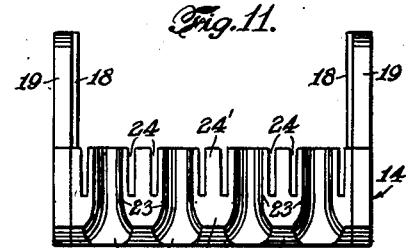
INVENTOR.
CHARLES SEAMAN
BY Wm. S. Pritchard
ATTORNEY.

Sept. 7, 1943.　　　　C. SEAMAN　　　　2,328,927
ATTACHMENT FOR MAKING PUFFED, SHIRRED MATERIALS
Filed Jan. 17, 1942　　　4 Sheets-Sheet 4

INVENTOR.
CHARLES SEAMAN
BY Wm. S. Pritchard.
ATTORNEY.

Patented Sept. 7, 1943

2,328,927

UNITED STATES PATENT OFFICE 2,328,927

ATTACHMENT FOR MAKING PUFFED, SHIRRED MATERIALS

Charles Seaman, Jamaica Estates, N. Y.

Application January 17, 1942, Serial No. 427,121

8 Claims. (Cl. 112—2)

This invention relates to a multiple-needle sewing machine, and more particularly to an attachment to be applied to a multiple-needle sewing machine for making a highly ornamental shirred material.

This invention is an improvement on that set forth in my prior Patent No. 2,147,462, issued February 14, 1939.

The nature and objects of the invention will become clear and apparent from the following description, appended claims, and accompanying drawings forming a part of this specification and wherein:

Figure 3 is a section taken on the line 3—3 of Figure 1;

Figure 4 is a section taken on the line 4—4 of Figure 3;

Figure 5 is a section taken on the line 5—5 of Figure 4;

Figure 6 is a section taken on the line 6—6 of Figure 1;

Figure 7 is a top plan view with various parts removed and showing the details of construction and the location of one of the members of the attachment with respect to the base plate, feed dogs and needle apertures;

Figure 8 is a section taken on the line 8—8 of Figure 1;

Figure 9 is a section taken on the line 9—9 of Figure 1;

Figure 10 is a top plan view of the presser foot toe;

Figure 11 is a plan view of the bottom of the presser foot toe;

Figure 1:
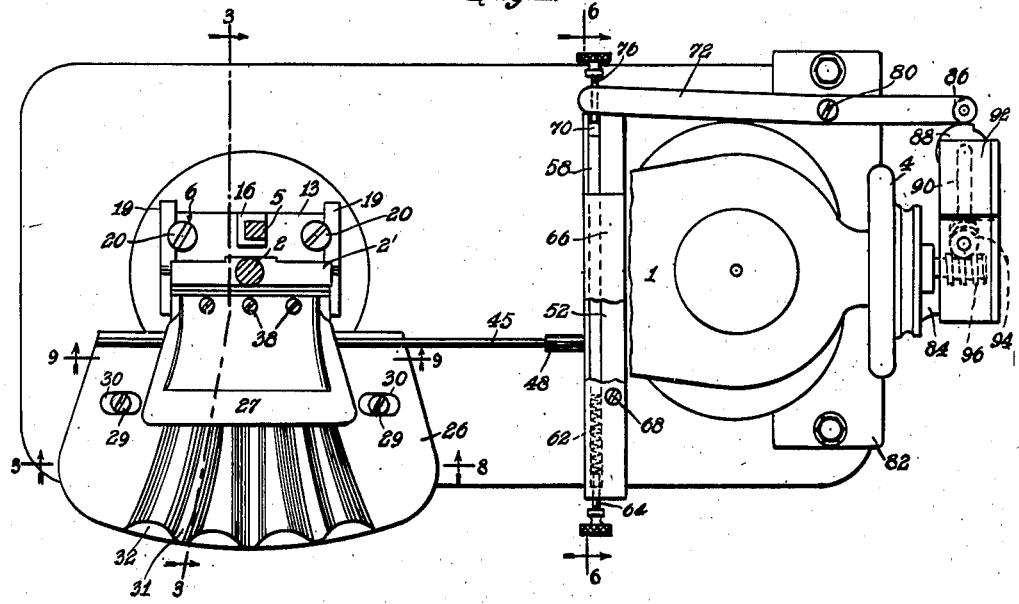
Figure 1 is a top plan view of the attachment as applied to a standard multiple-needle sewing machine head, with parts broken away to more clearly illustrate the details of construction.
Figure 2:
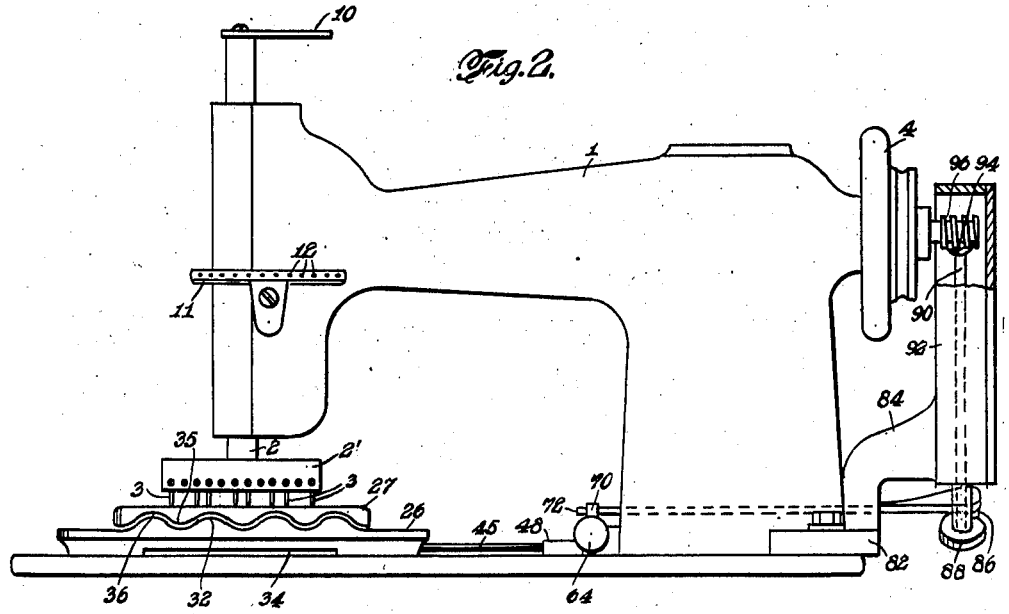
Figure 2 is a side elevation of a standard multiple-needle sewing machine having applied thereto the attachment constituting one phase of the invention.

Referring now to the drawings wherein an illustrative apparatus for securing the objects of the invention is shown and wherein like reference numerals designate like parts, the reference numeral 1 designates a multiple-needle sewing machine head supporting a needle bar 2 provided with a needle carrier 2' in which a plurality of needles 3 are mounted. The needle bar 2 is actuated (vertically reciprocated) by means (not shown) operated by a pulley 4 which, in turn, is driven in any well-known manner. The head 1 is also provided with a presser foot bar 5 carrying a presser foot generally indicated by the reference numeral 6 and hereinafter more fully described. The head 1 is also provided with the usual means for vertically adjusting the presser foot bar and also with a manually actuated handle or lever (not shown) of the usual type for raising and lowering the presser foot.

The machine also includes a work-feeding mechanism which comprises a plurality of spaced feed dogs 7 positioned with respect to the presser foot 6, as hereafter explained, and extending through slots 8 in the base plate 9 of the machine. The feed dogs 7 are operated and actuated in the usual well-known manner.

Means are also provided to guide the threads (not shown) from their source of supply to the respective needles. In the form shown, this is accomplished by a thread guide 10 pivotally mounted on the needle bar 2 and the thread guide 11 secured to the machine head intermediate the guide 10 and the needles 3. Each of the guides 10 and 11 is provided with a plurality of apertures 12, the number of which corresponds to the number of needles 3 that the machine is designed for, so that a thread for each needle can be fed thereto.

The presser foot, generally indicated by the reference numeral 6, comprises a body member 13 and a toe 14. The body member 13 comprises a plate formed with slots 15 through which the needles 3 pass in the course of the stitching operation. The body member 13 is also provided with a grooved block 16 which is slidably and adjustably mounted on the presser foot bar 5. By means of a set screw 17, the presser foot 6 is secured to the presser foot bar 5. By this construction, the presser foot 6 is capable of adjustment.

The longitudinal edges of the body member 13 of the presser foot 6 are positioned beneath and cooperate with overhanging flanges 18 of the spaced arms 19 of the toe 14. By means of set screws 20, the body member 13 is secured to the arms 19, as shown in Figures 4 and 5 of the drawings. By this construction, the body member 13 can be moved and adjusted to the desired position on the arms 19, thereby properly positioning the slots 15 thereof with respect to the needles 3. This construction also permits adjustment of the body member 13 with respect to the toe 14.

The details of construction of the presser foot toe 14 are generally indicated in Figures 4, 10 and 11. Between the forward ends of the spaced arms 19 there is secured a block 21, which on the under surface thereof is formed with alternate curved grooves 22 and ridges 23 for reasons which will become apparent. Each of the ridges 23 at its forward end is solid and beveled or curved so as to permit easy movement of the material therein or thereunder. The rear portion of each of the ridges 23 is provided with a plurality of slots 24 through each of which a needle 3 passes in the stitching operation. It is to be noted that the members adjacent the slots 24 are beveled. This is for the purpose of permitting a certain amount of play in the needles during the stitching operation. The lower surfaces of the ridges 23 are substantially flat and serve to press the material fed thereunder into position for feeding by the feed dogs 7. It is further to be noted that each feed dog 7 is positioned intermediate the slots 24 and cooperates with the front portion of the ridges 23 and the parts 24' intermediate the slots 24 as well as the body member 13.

The toe 14 is positioned and adjusted in the machine so that the needles 3 will pass through the slots 24 and thus stitch the goods prior to leaving the toe 14. This is shown in Figure 3. As shown in Figure 3, the toe 14 of the presser foot is in closer proximity to the feed dogs than the body member 13. Consequently the goods under the toe 14 are fed to stitching position at a greater speed than the goods are withdrawn under the body member 13, with the result that the goods are shirred prior to stitching. The same results may be secured by having the dogs 7 cooperate only with the toe 14.

A mechanism, generally indicated by the reference numeral 25, is designed and constructed to form longitudinal corrugations (furrows and ridges) in the shirring material fed therethrough. As clearly shown in Figures 3 and 4, the mechanism 25 comprises a lower member 26 and an upper member 27 forming a passage 25' therebetween which imparts the alternate and longitudinally extending furrows and ridges to the shirring material fed therethrough.

The lower member 26 is adjustably mounted on the base of the machine in any suitable manner. In the form shown, the plate 26 is secured to the base by means of screws 29 cooperating with slots 30 formed in said plate.

The top surface of the plate 26 is provided with alternate grooves 31 and ribs 32. The ribs 32, as shown in Figure 7, are provided with spaced fingers 33 which extend in the grooves 22 of the toe 14 (see Figure 4). As shown in Figures 2, 7, 8 and 9, the ribs 32 flare outwardly from the rear end to the forward end thereof. The plate 26 is also provided with a groove 34 in the bottom thereof which, together with the base or work support of the machine, constitutes a passage through which a base material to which the shirring may be stitched may be fed to the needles. It is to be noted that the base material, when used, is fed in a flat condition beneath the shirring material to the presser foot toe 14. During the feeding thereof under the toe 14, the base material is also shirred.

The top plate 27 is on its under surface also provided with alternate grooves 35 and ribs 36. The ribs 36 of the plate 27 are disposed in the grooves 31 of the plate 26, and the grooves 35 of the plate 27 receive the ribs 32. By this arrangement, the plates 26 and 27 produce the corrugated passage 25' (see Figures 8 and 9) whereby material fed therethrough is given a corresponding shape. It is to be noted that the grooves 35 and ribs 36 of the top member 27 terminate adjacent the edge 27' of the plate 27.

In the embodiment shown, the toe 14 of the presser foot 6 is secured to the plate 27. Thus, the passage 25' is directly controlled by the presser foot. Upward and downward movement of the presser foot 6, or even the toe 14 thereof, will cause corresponding upward and downward movement of the plate 27. With the foregoing in view, the upper surface of the plate 27 is provided with a forwardly projecting flange 37 which extends over onto the block 21 of the toe 14, and the two are secured thereto by means of screws 38 passing through aligned holes in said flange and block.

Each of the fingers 33 is formed of a resilient material, such as a spring wire, and, as shown in Figure 7, the end 39 thereof is secured to the respective ridge 32 in any appropriate manner, for example by being soldered or welded thereto. In the instant construction, each finger 33 is of such length and normally is disposed at such an angle so as to permit the ridge formed by the plates 26 and 27 and passing thereover to be pulled out, flattened or collapsed as the material is fed thereover in its passage to the needles, with the consequence that a flattened shirred material is produced. Means are provided to automatically at predetermined times elevate the respective fingers 33, and particularly the free ends 40 thereof, and maintain said fingers in the elevated position so that the ridge formed in the shirring material by the mechanism 25 and passing over said fingers will be maintained, with the consequence that the material on passing to the needles will be stitched in this condition and produce a puffed shirred material.

The means for automatically raising at predetermined periods the fingers 33 to produce the puffed shirred material is shown in Figures 1, 2, 5 and 6.

Referring now to Figure 5, the lower plate 26 is provided adjacent to or in the neighborhood of its forward extremity with a recess 44, in which there is positioned a rotatable shaft 45 provided with a plurality of radially positioned pins 46 which, upon actuation (oscillation) of said shaft 45 as hereinafter more fully described, is caused to periodically engage the finger 33 disposed thereabove and elevate the same and maintain it in the elevated position for a predetermined period of time in order to produce a predetermined length of puffed shirring. The opposite end of the shaft 45 is secured in a sleeve 48, which is rotatably mounted in a recess 50 formed in a block 52 secured to the work plate in any convenient manner, for example, by screws 54. The sleeve 48 is provided with a segmental gear 56 which is designed to be actuated upon the reciprocation of a rack 58 slidably mounted in a recess 60 formed in the top of the block 52.

The end of the rack 58 within the recess cooperates with a tension spring 62, the tension of which can be adjusted and controlled by the manually operated screw 64 passing through the block 52, as shown in Figure 6. A cover plate 66, covering the recess 60 and the elements positioned therein, is provided and it is secured in position by means of screws 68.

The rack 58 is reciprocated by means interconnected to the main drive shaft of the machine head, as will now be described. The rack 58 is provided with a flange 70 to which one end of a lever 72 is operatively connected. As shown in Figure 6, the lever 72 is provided with a tapped aperture 74 into which a screw 76 passes and impinges upon the flange 70. The lever 72 is pivotally mounted, as at 80, on the base 82 of a bracket 84. The opposite end of the lever 72 is provided with a cam follower 86, which is adapted to cooperate with a cam 88. The cam 88 is carried at the lower end of a vertical shaft 90, which is rotatably journaled in the frame 92 carried by the bracket 84. The vertical shaft 90 is provided with a gear 94, which is adapted to mesh with a worm 96 mounted on the main shaft of the machine adjacent the pulley end, as more particularly shown in Figures 1 and 2.

The pins 46 are located on the shaft 45 at positions which will produce the desired puffed shirring effect in the product. In the form shown, the pins 46 are located and positioned so that when the first and third fingers 33 are in the elevated position, the second and fourth fingers are in normal (non-elevated) position, and vice versa. Such an arrangement will produce puffed shirred materials of the type and nature set forth in Figures 12–18 inclusive, and more particularly hereafter described. It is, of course, to be understood that the pins may be so disposed on the shaft 45 so that all of the fingers will be simultaneously elevated, or the first two fingers elevated while the remaining fingers are not elevated, or the first and fourth fingers elevated while the second and third fingers are not elevated, etc., whereby different effects are produced in the product.

The length of time during which any particular pin maintains any particular finger in raised position depends on the contour of the cam 88 and upon the stroke of the rack 58. By use of cams 88 of various contours, different puffed effects and different lengths of the puffed areas may be secured. The spring 62 is adapted to maintain the flange 70 always in contact with the screw 76. By adjusting the screw 76, the stroke of the rack 58 may be adjusted.

In operation, after the attachment has been secured to the machine head and the various parts adjusted as necessary, the shirring material is fed into and through the passage 25' formed by the plates 26 and 27 whereby it is provided with alternate ridges and furrows. At the same time a base material to which the shirred material is to be stitched is fed through the groove 34 and beneath the presser foot toe 14. The ridges of the shirring material pass over the fingers 33 in the course of their travel to the toe 14 and on top of the base material. By virtue of the fingers 33 and the details of construction of the toe 14, the ridges of the corrugations in the material are fed into the grooves 22 of the toe, in either a puffed, flattened or collapsed condition depending upon whether the fingers are in the elevated position or not, and the furrows of the corrugated shirring material are fed underneath the flat ridges 23 of the toe. The feed dogs 7 feed the materials in position for stitching by the needles 3. Due to the relationship of the body member 13 and the toe 14 with respect to the feed dogs 7, as previously explained, the materials are shirred and in this condition fed to the needles for stitching. As shown in Figure 3, the needles 3 stitch the materials while they are still in cooperative relationship with the toe. In other words, the stitching is effected while the shape of the shirring material is maintained in accordance with the positions of the fingers 33, which are actuated by the pins 46 on the shaft 45, which is oscillated by the rack 58 reciprocated as previously described. Thus, when a finger is in an elevated position, the shape of the portion of the shirring material controlled by said finger will be such as to produce a puffed shirring. When the finger is in its normal position (non-elevated), the ridge will be pulled out or collapsed, with the result that a flat shirring will be obtained. Each needle passes through the slots 24 and stitches the materials at points immediately therebeneath. The ridges of the corrugated shirring material, which are maintained by the elevated fingers, constitute a puffed shirring, while the collapsed ridges obtained when the fingers are not in elevated position produce flat shirrings in the final product. The stitches extend longitudinally of the product and are substantially at the longitudinal edges of the flat shirring formed from the furrows.

Due to the shirring operation, an excess of shirring material is provided in the ridge portion (whenever maintained) of the shirring material which is disposed in the grooves 22 of the toe 14. After the material is stitched as aforementioned and leaves the machine, the excess material in the ridges assumes a more or less ornamental appearance, the ornamental appearance depending upon the adjustment of the various parts of the apparatus as well as upon the size of the stitch.

The base material to which the shirring material is stitched serves to permanently retain the puffed shirring and the flat shirring in place. As will be hereafter explained, it is not necessary in all cases to use a base material to retain the shirred areas in place.

In the form shown, which utilizes an eight-needle machine, there is produced eight rows of spaced stitches extending longitudinally of the product and which form seven longitudinally extending zones. The first, third, fifth and seventh zones each consist of spaced puffed shirred areas separated by flat shirred areas. The second, fourth and sixth zones each consist of a flat shirred area which is coextensive with the said zones. The length of the puffed shirred areas and the length of the flat shirred areas in the first, third, fifth and seventh zones are controlled by the interval of time during which the fingers 33 are elevated and not elevated, respectively. These features, as previously described, depend on the contour of the cam 88 and the stroke of the rack 58, and the position of the pin 46 on the shaft 45.

It is to be understood that the invention is not restricted to an eight-needle machine. Any machine having a plurality of needles (i. e. more or less than eight) may be used, provided proper modification of the mechanism 25 and presser foot 6, as will be necessary to accommodate these features to the number of needles, is made. Likewise, the widths of the aforementioned zones may be varied by modifying the widths of the mechanism 25 and the presser foot 6 and the spacing of the needles.

Referring now to Figures 12–17 inclusive, the reference numeral 100 designates a flat shirred base material to which the shirred material 101 is secured by stitches 102 extending longitudinally of the product, the stitches and base material serving to permanently retain the shirrings in place.

The stitches also divide the product into a plurality of longitudinal zones. Each of the alternate longitudinal zones, designated by the reference numeral 105, consists of a plurality of spaced puffed shirred areas 106 separated by flat shirred areas 107. Each of the alternate zones, designated by the reference numeral 108, consists of flat shirred areas coextensive with said zones.

The puffed shirred areas 106 project upwardly in the product and the tops thereof lie in a horizontal plane higher than the horizontal plane in which the tops of flat shirred areas lie. It is further to be noted that the flat shirred areas are in intimate contact with the backing.

In the form shown, the puffed areas 106 in the respective zones 105 are preferably arranged in staggered relationship, though, as previously described, they may be arranged otherwise as desired. Furthermore, in the form shown, the number of shirrings per inch in the areas 107 and 108 is substantially the same.

Figure 12:
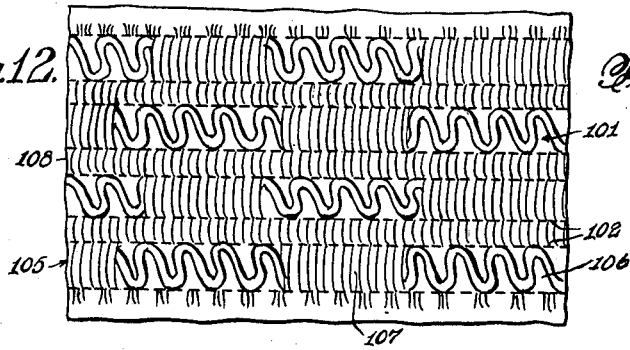
Figure 12 is a top plan view of one form of shirred material produced by the invention.
Figure 13:
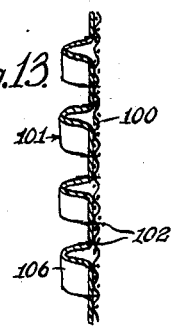
Figure 13 is an end view of the material shown in Figure 12.
Figure 14:
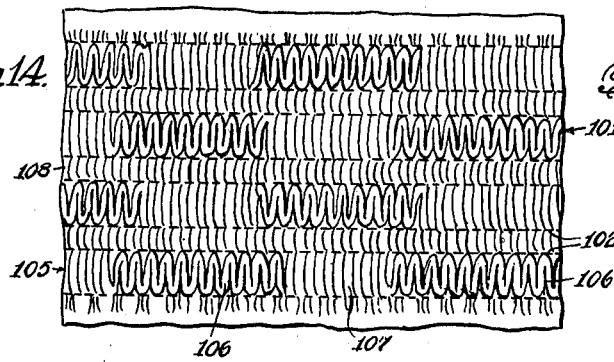
Figure 14 is a top plan view of another form of shirred material produced by this invention.
Figure 15:
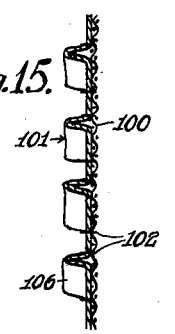
Figure 15 is an end view of the material shown in Figure 14.
Figure 16:
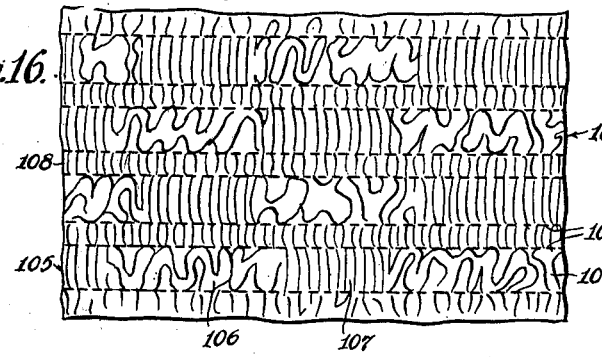
Figure 16 is a top plan view of still another form of shirred material produced by this invention.
Figure 17:
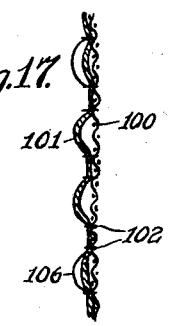
Figure 17 is an end view of the material shown in Figure 16.

The final appearance of the product, and particularly the puffed shirred areas in the respective zones, is also dependent upon the type of material employed therefor. Even with the same material, different appearances of puffed shirring are secured if the shirring material is bias-cut, cross-cut, or cut lengthwise. When the shirring material is bias-cut, the puffed shirring will assume a configuration or form such as shown in Figure 12. When the shirring material is cross-cut, the puffed shirring assumes substantially the shape and form shown in Figure 14. When the shirring material is cut lengthwise, the puffed shirring assumes the form and shape shown in Figure 16.

Figure 18:
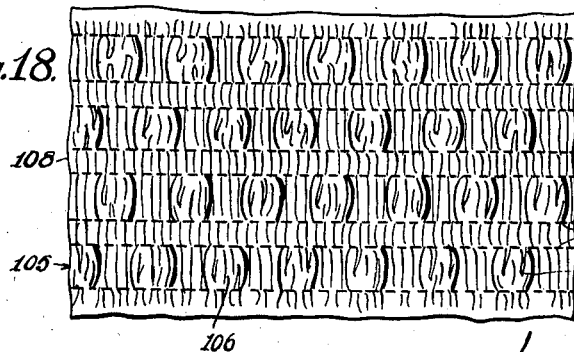
Figure 18 is a top plan view of another form of shirred material produced by this invention.
Figure 19:
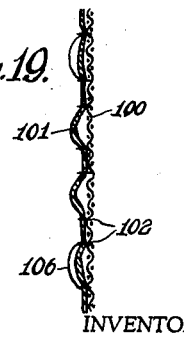
Figure 19 is an end view of the material shown in Figure 18.

In the products produced by the instant invention and previously described, there is provided the backing 101 which is flat shirred and which cooperates with the stitches to substantially maintain the shape and form of the shirred areas, and particularly the puffed shirred areas, permanently. I have found that when the puffed shirred areas are relatively small, as shown in Figure 18, it is unnecessary to have a backing, and the stitches themselves are sufficient to maintain the shape and form of the puffed shirred areas as well as the flat shirred areas substantially permanent.

Since it is obvious that various changes and modifications may be made in the above description without departing from the nature or spirit thereof, this invention is not restricted thereto except as set forth in the appended claims.

I claim:

1. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, and intermittently acting means cooperating with said toe to periodically engage the ridges of the material fed thereover by the feed dogs of the machine and maintain the same in position for a predetermined time to produce puffed shirrings of predetermined lengths.

2. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, fingers carried by one of said plates and extending into the grooves of said toe, said fingers being normally disposed to present the material fed thereover by the feed dogs of the machine in position for flat shirring, and means to periodically raise said fingers to engage the ridges of the material passing thereover and maintain the same in position to produce puffed shirrings.

3. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally disposed at an inclination to permit a ridge in the material passing thereover to collapse and be presented in condition for flat shirring, and means to periodically actuate each of said fingers to engage and maintain the ridge passing thereover for a predetermined time in condition to produce longitudinally spaced puffed shirrings of predetermined lengths.

4. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally positioned to present the ridge passing thereover in condition for flat shirring, a pin beneath each of said fingers adapted to be actuated to elevate the finger thereabove and maintain it in elevated condition to maintain the ridge passing thereover in condition to produce longitudinally spaced puffed shirrings of predetermined lengths, and means adapted to periodically actuate said pins.

5. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally positioned to present the ridge passing thereover in condition for flat shirring, a pin beneath each of said fingers adapted to be actuated to elevate the finger thereabove and maintain it in elevated condition to maintain the ridge passing thereover in condition to produce longitudinally spaced puffed shirrings of predetermined lengths, said pins being mounted radially on a shaft in accordance with the longitudinally spaced puffed shirrings desired, and means adapted to actuate said shaft.

6. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally positioned to present the ridge passing thereover in condition for flat shirring, a pin beneath each of said fingers adapted to be actuated to elevate the finger thereabove and maintain it in elevated condition to maintain the ridge passing thereover in condition to produce longitudinally spaced puffed shirrings of predetermined lengths, said pins being mounted radially on a shaft in accordance with the longitudinally spaced puffed shirrings desired, and means adapted to be connected to the drive shaft adjacent the pulley of the machine to actuate said shaft.

7. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally positioned to present the ridge passing thereover in condition for flat shirring, a pin beneath each of said fingers adapted to be actuated to elevate the finger thereabove and maintain it in elevated condition to maintain the ridge passing thereover in condition to produce longitudinally spaced puffed shirrings of predetermined lengths, said pins being mounted radially on a shaft in accordance with the longitudinally spaced puffed shirrings desired, a rack and pinion adapted to actuate said shaft, a pivoted lever having one end thereof connected to said rack and the opposite end thereof carrying a cam roller, a cam adapted to cooperate with said cam roller, and a rotatable shaft carrying said cam and adapted to be driven by the shaft of the machine adjacent the pulley.

8. An attachment for a multiple-needle sewing machine comprising a pair of plates in superimposed relationship and having a passage therebetween which imparts alternate ridges and furrows to a material fed therethrough, a presser foot having a toe provided with alternate ridges and grooves and positioned to receive the material issuing from the passage of said plates, a plurality of spaced fingers carried by one of said plates, each of said fingers extending into a groove of said toe and being normally positioned to present the ridge passing thereover in condition for flat shirring, a pin beneath each of said fingers adapted to be actuated to elevate the finger thereabove and maintain it in elevated condition to maintain the ridge passing thereover in condition to produce longitudinally spaced puffed shirrings of predetermined lengths, said pins being mounted radially on a shaft in accordance with the longitudinally spaced puffed shirrings desired, a block adapted to be secured to the work plate of the machine, a segmental gear journaled in said block and connected to said shaft, a rack slidably disposed in said block cooperating with said segmental gear, a spring acting on one end of said rack, a pivoted lever having one end thereof connected to said rack and the opposite end thereof carrying a cam roller, a cam adapted to cooperate with said cam roller, and a rotatable shaft carrying said cam and adapted to be driven by the shaft of the machine adjacent the pulley.

CHARLES SEAMAN.